United States Patent
Weiβ et al.

(10) Patent No.: US 8,915,482 B2
(45) Date of Patent: Dec. 23, 2014

(54) SOLENOID WITH AN ARMATURE

(75) Inventors: Johann Weiβ, Wangen (DE); Peter Wiedemann, Derndorf (DE)

(73) Assignee: SVM Schultz Verwaltungs—GmbH & Co. KG, Memmingen (DE)

( * ) Notice: Subject to any disclaimer, the term of this patent is extended or adjusted under 35 U.S.C. 154(b) by 492 days.

(21) Appl. No.: 12/923,301

(22) Filed: Sep. 14, 2010

(65) Prior Publication Data

US 2011/0062363 A1    Mar. 17, 2011

(30) Foreign Application Priority Data

Sep. 14, 2009  (DE) .......................... 10 2009 041 188

(51) Int. Cl.
*F16K 31/02* (2006.01)
*H01F 7/16* (2006.01)
*H01F 7/08* (2006.01)

(52) U.S. Cl.
CPC .............. *H01F 7/1607* (2013.01); *H01F 7/088* (2013.01); *H01F 2007/086* (2013.01)
USPC ....................................... 251/129.15; 251/64

(58) Field of Classification Search
USPC .............................................. 251/64, 129.15
See application file for complete search history.

(56) References Cited

U.S. PATENT DOCUMENTS

| | | | | |
|---|---|---|---|---|
| 3,013,768 A | * | 12/1961 | La Mastra | 251/129.15 |
| 4,854,429 A | * | 8/1989 | Casey | 188/266.2 |
| 4,901,974 A | * | 2/1990 | Cook et al. | 251/129.15 |
| 5,076,538 A | * | 12/1991 | Mohr et al. | 251/129.18 |
| 5,503,184 A | * | 4/1996 | Reinartz et al. | 137/625.3 |
| 5,553,829 A | * | 9/1996 | Hemsen | 251/129.21 |
| 7,051,993 B2 | * | 5/2006 | Kim et al. | 251/129.15 |
| 7,857,282 B2 | * | 12/2010 | Goossens | 251/129.07 |

FOREIGN PATENT DOCUMENTS

JP      H07-208635      8/1995

* cited by examiner

*Primary Examiner* — John K Fristoe, Jr.
*Assistant Examiner* — Angelisa Hicks
(74) *Attorney, Agent, or Firm* — Jacobson Holman Hershkovitz

(57) ABSTRACT

The invention refers to a solenoid which comprises at least one armature supported in an armature space. The armature space is encircled by a coil carrying a number of windings which can be loaded with current. The magnetic field generated when loaded with current moves the armature against the pole core. In the armature a rebounding tappet is supported moving. Its tappet front facing the pole core projects, when not electrified, over the front of the armature.

12 Claims, 2 Drawing Sheets

SOLENOID WITH AN ARMATURE

Figure 1:
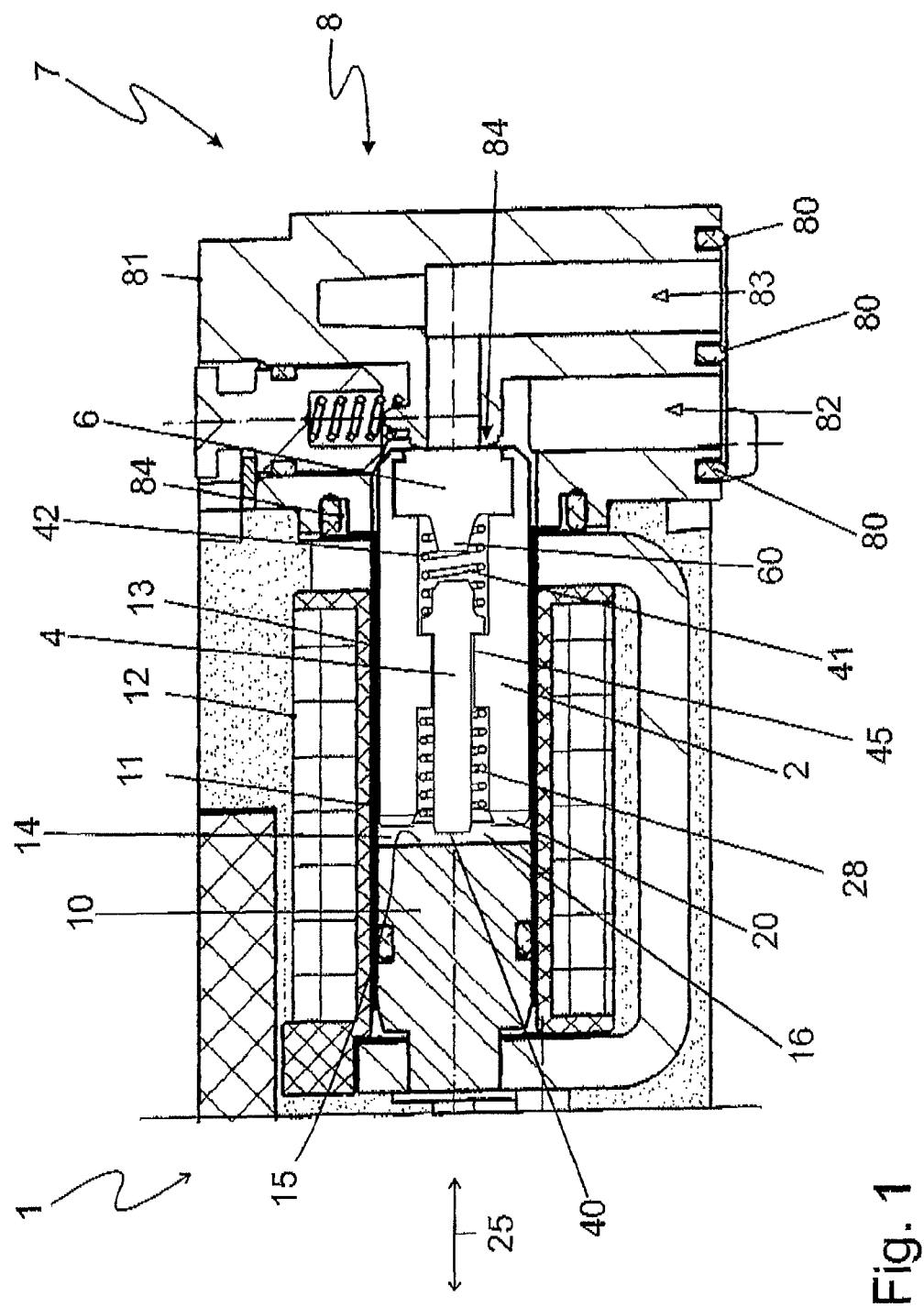

This application has a priority of German no. 10 2009 041 188.7 filed Sep. 14, 2009, hereby incorporated by reference.

The invention refers to an armature, at least comprising one armature supported in an armature space, the armature space being encircled by a coil carrying a number of windings which can be loaded with current and the magnetic field generated, when loaded with current, moving the armature against the pole core.

BACKGROUND OF THE INVENTION

Solenoids of this type are known in a large range in technology. The movement of the armature is used for triggering very different elements, for example, solenoids are used for triggering valve elements. Solenoids are expected to have a long service life, that means they are supposed to outlast a number of switching processes reliably and with a quality as constant as possible and that they are accordingly reliable.

For example, the armature is held by a suitable pull-back spring in unelectrified condition of the solenoid in a final position. If now the power winding is loaded with current, the magnetic field forms in the interior of the coil, in particular in the armature space, and acts on the armature which then is accelerated rather fast and bounces against the pole core. The result is a certain wear which leads during a number of switches (for example 10 million, 15 million or 20 million switches) to a considerably changed switch behaviour of the solenoid. It has been observed that ruptures on the armature have been the result of the high bouncing energy and this has reduced the quality of running of the armature which leads to corresponding conspicuous behaviour during the drop-out of the armature.

BRIEF ABSTRACT OF THE INVENTION

Referring to this state of the art it is an object of the invention to increase the reliability of a solenoid.

In order to solve this problem the invention refers to a solenoid as described in the beginning, and suggests that in the armature a rebounding tappet is supported moving, and in unelectrified condition the distance between the front of the tappet and the core is smaller than the distance between the front of the armature and the pole core.

In order to reach this the invention suggests that in the armature a rebounding tappet is supported moving, and the front of the tappet facing the pole core projects over the front of the armature in unelectrified condition. Another alternative is that the pole core has a raised part in the area where the rebounding tappet hits, and thus the front of the tappet can recede behind the front of the armature. The effect is that, nevertheless, first of all, the front of the tappet bounces against the core (and that is in the area of the raised part, of course considering a suitable dimensioning). The raised part can be formed, for example, cone-like, and immerses then slightly in the armature.

According to the invention, in the armature, which is designed, according to the invention, in one piece or even several pieces, a rebounding tappet supported moving is arranged which first of all bounces against the surface of the pole core during the attraction motion of the armature, and thus already absorbs a part of the kinetic energy. The rebounding tappet projects here slightly over the armature in such a way that the front of the tappet, when not electrified, projects slightly in the air gap forming between the armature and the pole core. Thus the front of the armature is defined as the side of the armature which is in front during the attracting or lifting movement of the armature (when the windings supported on the coil are electrified) in the direction of the armature.

In the arrangement suggested according to the invention in unelectrified condition the distance between the front of the tappet to the core is smaller than the air gap which is defined by the distance between the armature or its front and the pole core.

The suggestion according to the invention makes it possible that the design of the air gap remains essentially unchanged. The air gap is formed between the metallic front of the armature or the often also metallic front of the tappet, on the one hand, and the pole core or the pole core surface, on the other hand. As no additional elements are provided in the air gap, the particular armature design does not further influence the magnetic qualities.

In a preferred modification of the invention it is provided that the armature carries an element compensating the kinetic energy of the armature in such a way that a rupture of the front of the armature because of the bouncing of the armature against the pole core surface is prevented, if possible.

This is reached for example by providing an element which destroys the energy of the armature which is suited for moving back the rebounding tappet in the drop-out situation (when the current through the coil is switched off again); for example, then the rebounding tappet is positioned in such a way that the front of the tappet again projects slightly over the front of the armature. For that suitable shock absorbers are possible, for example.

In another modification according to the invention in the armature an elastic element, in particular a tappet spring, is provided for the rebounding tappet, and the elastic element is compressed when, during loading with current, the armature moves towards the pole core, and the front of the tappet is in contact with the pole core or bounces against it.

The use of the tappet spring leads to a better drop-out behaviour as an additional push-back force of the rebounding tappet is available by the compressed tappet spring.

The arrangement is here chosen in such a way that the rebounding tappet absorbs at least a part of the kinetic energy which the accelerated armature of the lifting movement has and compensates it. The still remaining rest energy is sufficiently low, so it does not do any damage to the armature.

Preferably, a modification according to the invention of the solenoid has in the armature an axial penetration opening for receiving the rebounding tappet. By means of such a design a space-saving arrangement of the rebounding tappet is possible. However, such a design comes with other advantages. The arrangement of a penetration opening in the armature removes material from the armature and thus also mass. The used rebounding tappet may not fill the complete volume of the penetration opening, it has a certain mobility in the penetration opening. This leads to a corresponding reduction of the entire mass of the armature together with the rebounding tappet and the other elements. When the design of the coil remains the same this improves the switching behaviour of the coil, that is accelerated, or there is the chance of saving windings with respect to the design of the coil, and thus of saving corresponding coil material to realize identical mechanic qualities. Therefore, such a design offers surprisingly additional saving potential or an acceleration of the performance of the solenoid designed according to the invention.

The penetration opening suggested according to the invention is here designed, for example, as gradual boring and thus offers the chance of receiving, for example, also a seal element. The term "axial" is defined here in the direction of the lifting movement, usually the armature is designed as cylindrical, in particular rotational symmetric, body with a longitudinal axis; the penetration opening is arranged parallel to this longitudinal axis, and thus axially.

The invention is not restricted here to the arrangement of an axial penetration opening. In a modification according to the invention it is also suggested that in the armature an axially arranged blind hole boring or a recess in the front of the armature is provided for receiving the rebounding tappet. Thus, on the bottom of the blind hole boring a corresponding support for the elastic element, for example the tappet spring, is formed. The armature itself then acts, for example, through another element on a control member, such as, for example, a sealing element of a valve block or the like.

In a preferred modification of the invention it is provided that the elastic element is supported on an element of the armature. The element of the armature on which the elastic element can be supported is, for example, the bottom of a blind hole boring or a suitable projection or step, flange or ring along the axial penetration opening in the armature serving for receiving the rebounding tappet.

Besides the modification that the elastic element can be supported on an element fixedly arranged in the armature, the invention comprises also solutions where the elastic element is supported on a seal element, and the seal element on the armature is arranged in a chamber on the backside opposite the front of the armature. The seal element is here manufactured of sufficiently elastic material, as it is actually used for seal elements, for example polymers, elastomers, sponge rubber, silicon or the like. The seal element often has here a certain elasticity so it can lie reliably on the seal seat and seal it. The sealing surface forming at the seal element for that ends flush with the surface terminating the armature backside, or projects a little over it. This makes sure that, first of all, the sealing element lies on the seal seat, before the armature finds a suitable (hard) support on the valve block. Of course, it is also possible that the sealing element in the armature has a certain mobility. In this modification according to the invention the seal element as well as the rebounding tappet are supported floating, and are supported via the elastic element, in particular the tappet spring, on one another, so that cleverly only one spring is required for the bounce absorption and the tolerance compensation of the sealing element. Thus a part of the kinetic energy of the armature is turned in tension energy of the tappet spring, or may be even destroyed during compression of the seal element. The heat generated here is conveyed to the surroundings without any problems.

The floating arrangement of the sealing element and the rebounding tappet supported via the tappet spring has the effect, that only one spring is necessary for the tolerance compensation of the sealing element, and thus also the sealing element is always arranged at the right position with respect to the armature backside.

According to the invention, the solenoid comprises solutions where the armature carries a sealing element as well as solutions where the armature acts on an operating pin. For that, the operating pin is designed separately, independent from the armature, and, for example, can be brought into contact with the armature if necessary by a suitable adjusting spring.

It is an advantage that on the armature an armature pull-back spring is arranged the effective direction of which is directed in opposite direction of the movement of the armature in the direction of the pole core. By the arrangement of the armature pull-back spring the armature is pushed back again in its starting position when the electric power is turned off, that means the air gap between the front of the armature and the core expands again. The armature pull-back spring is here supported, for example, in the pole core or the armature in a suitable way. Cleverly, in a modification according to the invention, it is provided for that that the armature pull-back spring is arranged in the area of the blind hole boring or the penetration opening facing the pole core. This is a space saving arrangement for the armature pull-back spring which immerses essentially in the armature and thus is not in the way.

According to the invention, of course also solutions are provided where the armature pull-back spring is supported on the front of the armature.

The penetration opening or the blind hole boring has here a sufficiently large diameter that in this the rebounding tappet as well as the armature pull-back spring can be accommodated.

In the armature then a suitable narrow or shoulder is provided, for example in the guide or center area, on which, on the one hand, the end of the armature pull-back spring can be supported, and, on the other hand, the rebounding tappet is guided. The result is here a compact solution.

In another embodiment of the invention it is provided that the chamber has on the (in)side opposite the backside a contact shoulder for the sealing element. Instead of the contact shoulder, which may extend radial with respect to the longitudinal axis of the armature (that is rectangular to the longitudinal axis of the armature) also, according to an alternative of the invention, an inner cone is provided expanding in the direction to the backside. This inner cone can also be called chamfer.

These two different modifications make it possible to adjust the electromagnetic behaviour of the armature and thus also of the entire solenoid according to the invention.

It is, in particular, provided in a modification according to the invention that the tappet spring is designed stronger or weaker than the armature pull-back spring. Of course, these two springs can be, in a modification according to the invention, identical with regard to their spring constant or stiffness.

By adjusting the tappet spring, in particular with a design of the chamber by means of a contact shoulder, it is possible, according to the invention, that the drop-out current can be adjusted variably to the respective requirements. In this case the tappet spring is designed (clearly) weaker than the armature pull-back spring. In the modification with an inner cone, however, it is favourable to use a tappet spring which is clearly stronger than the armature pull-back spring. The result is here that the sealing element in the drop-out condition (that is, when the electric power through the windings of the solenoid is switched off) cannot recede by the force of armature pull-back spring. This rather strong tappet spring, however, effects, on the other hand, that also on the rebounding tappet a large force is exercised which, first of all, acts in the attracted condition of the armature, and influences the absorption behaviour and the rest air gap (drop-out current).

In the modification according to the invention where the chamber is designed with a contact shoulder, the shoulder surface of which extends radial with regard to the longitudinal axis, the sealing element can be supported actually on this contact shoulder. The sealing element can here in the drop-out condition, that is while the current is switched off, because of the power of the armature pull-back spring not recede at any length to the back or inward. The tappet spring can be designed, as a consequence, considerably weaker and then also weaker than the armature pull-back spring.

The result is that by choosing the stiffness of the tappet spring and the armature pull-back spring, on the one hand, and the design of the chamber receiving the sealing element the behaviour of the armature can be adjusted for a large range. There is the possibility to adapt the absorption behaviour and the drop-out current very variably to the requirements.

In a preferred embodiment of the invention it is provided that the rebounding tappet has an expansion on its base area opposite the front of the tappet, the expansion being pressed by the tappet spring in unelectrified condition against an inner stopper of the armature. The tappet spring engages on the base area, that is the bottom end of the rebounding tappet. The axial penetration opening in the armature has a narrow through which a stopper is formed in the armature. By means of such a design the way is defined by which the front of the tappet projects (or recedes) over the front of the armature. At the same time, the rebounding tappet is guided in the narrower area which is linked to the stopper in the armature, in the area of the axial penetration opening.

The armature is made from magnetizable material to react in a proper way to the connected magnetic field. Usually, the armature is consists of metal, for example suitable alloys or steels. The armature is here designed, for example, as turned part which has been machined later to integrate the axial penetration opening or blind hole boring or the like.

In a modification according to the invention, however, it is provided that the armature is designed as section of a pipe profile. For a save support of the rebounding tappet or the other elements (elastic element, sealing element or tappet spring and so on) then accordingly forming machining steps will follow. The use of a pipe profile saves, of course, the rather expensive machining step.

According to the invention the rebounding tappet is formed, for example, of metal, steel, light metal, plastic or fiber reinforced plastic. The design of the rebounding tappet of metal has, of course, the advantage that the mechanically rather strongly stressed head area of the rebounding tappet is sufficiently stable. However, also highly resistant synthetic materials are known which are suitable for this case of application. The advantage of using synthetic material is in particular that the entire weight of the armature is thus reduced. The resulting advantages have already been pointed out.

The invention does not only comprise a solenoid as described, the invention also comprises a valve, in particular a pneumatic valve with a solenoid as described, the armature carrying on its side opposite the pole core a sealing element which interacts with a seal seat of the valve. The sealing element is here on the backside opposite the front of the armature. Such a design provides a fast switching, that is fast reacting, but also permanently working valve, in particular pneumatic valve.

The arrangement is basically also suited for hydraulic valves.

The arrangement is here often chosen in such a way that the armature space and the interior of the armature, respectively, are filled with the medium to be controlled, as the seal seat is connected to a terminating wall of the armature space.

BRIEF DESCRIPTION OF THE DIFFERENT VIEWS OF THE DRAWINGS

Figure 2:
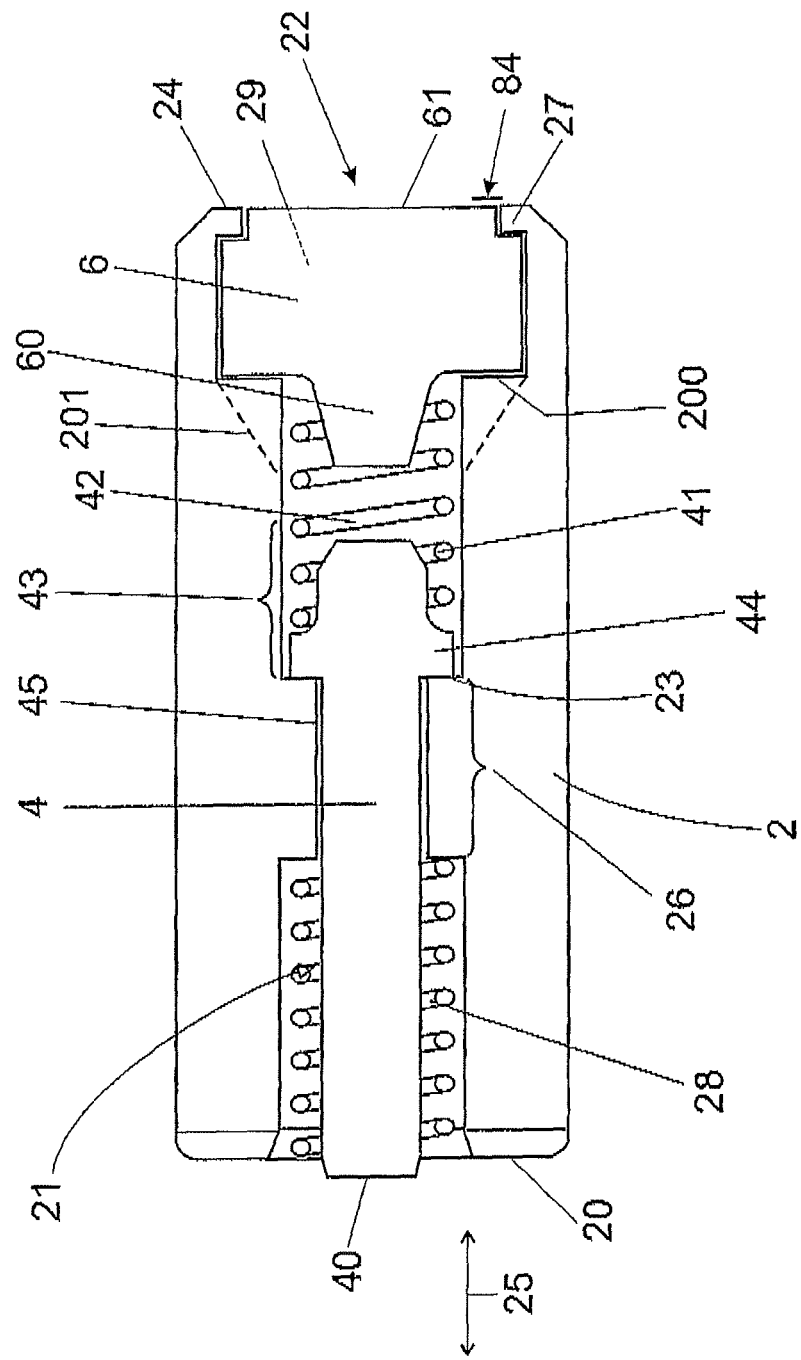

In the drawing the invention has been shown schematically in particular in an embodiment. In the drawings:

FIG. 1 a section through a solenoid and a valve, respectively, according to the invention and FIG. 2 a section through the armature according to the invention, in the section two modifications being shown.

DETAILED DESCRIPTION OF THE PREFERRED EMBODIMENT

In the figures identical or corresponding elements each are indicated by the same reference numbers, and thus are, if not useful, not described anew.

In FIG. 1 the valve 7 according to the invention, comprising the solenoid 1 according to the invention and the valve block 8, is shown. The basic construction of the valve 7 is sufficiently known.

The valve block 8 comprises a valve housing 81 in which a pressure line 82 and a work line 83 are provided. These extend, first of all, in a diagonal boring (with reference to the lifting movement) of the armature 2 essentially rectangular to run then with an axial connecting boring into the armature space 14 of the axial solenoid 1.

Via the seals 80 the valve housing 81 is connected to the different connecting lines; the seal 84 is provided between the valve housing 81 and the solenoid 1, and seals this area.

The construction of the solenoid 1 according to the invention is also known in the state of the art. The armature space 14 is encircled in the embodiment shown here by a pole pipe 13. At least partly, the armature space 14 is encircled by the pole pipe 13 as well as the coil body 11, the pole pipe 13 projecting a little over the coil body 11 in the direction of the valve block 8; the armature space 14 is even more expanded across the end of the pole pipe 13 in the direction of the valve block 8. The coil body 11 carries the windings 12 of wire which can be loaded with current. The flow of current through the windings 12 generates a magnetic field acting on the armature 2 which is supported moving (see double arrow 25) axially in the armature space 14.

The solenoid 1 has on its area opposite the valve block 8 a pole core 10 on which the pole pipe 13 is slipped. The pole core surface 15 facing the armature 2 terminates the air gap 16 between the front 20 of the armature and the pole core 10.

In the design of the solenoid 1 shown in FIG. 1 the connected technology of the solenoid is not shown, it is not essential for the design of the invention.

In FIG. 2 the armature 2 is shown drawn out in detail.

The embodiment selected to be shown in FIG. 2 comprises two different designs of the armature 2. Both modifications differ with regard to the terminating or partly limiting surface for the chamber 29 facing inward which is realized in a first modification with a radial extending (therefore annular) contact shoulder 200 (shown with a continuous line), and in the other modification (dashed) is realized designed with an inner cone 201.

The lifting movement which follows when the armature 2 is moved because of the magnetic field (this is generated by the current flowing through the winding of the coil) shifts the armature 2 to the left. This movement is indicated by the double arrow 25.

In the lifting movement shifted to the left front the front 20 of the armature terminating the armature 2 is provided. Concentrically with reference to the longitudinal axis of the armature 2 a penetration opening 21 is provided which is formed because of the different diameters of the penetration opening 21 along the axis of the armature 2 as gradual boring with different projections and undercuts. In the front area of the penetration opening a diameter is selected which leaves enough space that here also an armature pull-back spring 28 can be put in. It projects slightly over the front 20 of the armature in non-electrified condition, and serves for bringing back the armature in drop-out (non-electrified) condition in its starting position. The armature pull-back spring 28 is here supported in the interior of the armature 2 on a narrower area of the penetration opening 21, for example, the guide area 26 which is realized by a suitable shoulder or a suitable step in the penetration opening 21.

Of course, the compressing of the armature pull-back spring 28 also causes an absorption of the kinetic energy of the armature 2 supporting a slowing-down of the armature and reducing the bouncing energy. The invention comprises here the arrangements where during the attraction movement of the armature 2, (when the windings 12 are flown through by current) the armature pull-back spring 28 comes in contact with the pole core surface 15 before or after the rebounding tappet 4.

Quite in the center of the armature 2 a guiding area 26 is provided forming a radial support of the rebounding tappet 4 guided or provided in the penetration opening 21. In this area the penetration opening 21 has an interior diameter which is only slightly larger than the outer diameter of the rebounding tappet 4. Coming from this center area 26 to the left as well as to the right (in axial direction) the penetration opening 21 widens each time.

The rebounding tappet 4 provided in the penetration opening 21 has a front 40 projecting over the front of the armature 20, and that is by a small area, for example only a few ¹/₁₀ mm or millimeters.

If the armature 2 bounces during the lifting movement into the pole core surface 15 of the pole core 10 terminating the lifting movement, first of all the front of the tappet 40 gets into contact with the pole core surface 15. By means of that the rebounding tappet 4 is shifted to the right relatively to the rest of the armature 2 and compresses the elastic element 41.

The elastic element 41 is here supported on the base area 43 opposite the tappet front 40 on the tappet 4. The base area 43 is here designed slightly tapered for easier mounting, and ends in an (annular) expanding area 44 the diameter of which is larger than the diameter in the center area 26.

With reference to the center area 26 seen to the right again an expansion of the inner diameter of the penetration opening 21 is linked, so that an interior stopper 23 is formed which limits the movement of the rebounding tappet 4 to the left (relatively to the armature 2). In unstressed condition the elastic element 41, which, in the embodiment shown here, is designed as tappet spring 42 (helical spring or the like), presses the expansion 44 against the interior stopper 23.

Mounting of the rebounding tappet 4 is here carried out from the right hand side in such a way that, first of all, the rebounding tappet 4 is inserted in the penetration opening 21, then the elastic element 41 or the tappet spring 42 is put on it, and, after that, a sealing element 6 is put in on the right end of the armature 4. The sealing element 6, for example a nipple is here in a chamber 29 which is part of the penetration opening 21. The diameter of the chamber 29 is here larger than in the area of the penetration opening 21 in which the tappet spring 42 is supported. This is reached by a suitable expansion of the inner diameter, which is carried out either gradually in the form of a contact shoulder 200 (drawn with a continuous line) or is realized by an inner cone 201 (drawn dashed). By means of this design of this area of the chamber and also the choice of the armature pull-back spring 28 and the tappet spring 42 the behaviour of the armature 2 can be set. It is clear that, of course, also suitable mixed types between the inner cone 201 and the contact shoulder 200 are part of the invention, or here also corresponding other contours, such as curvatures, inward-bent surfaces and so on can be used to the full extent.

It is clear that the chamber 29 is here a part area of the penetration opening 21, and is not closed, but terminated, by the inner cone 201 or the contact shoulder 200.

The length (seen in axis direction or the direction 25 of movement of the armature 2) of the chamber 29 is slightly larger than the height of the sealing element 6, the guide cone 60 not taken into consideration here. The result is here that the sealing element 6 in the chamber 29 has an axial as well as an radial allowance or movement according to the invention. On the backside 22 on the armature 2, terminating the chamber 29, an inner flange 27 is provided against which the sealing element 6 is pressed by the tappet spring 42. The sealing element 6 has the task of acting on a corresponding valve seat, and thus interrupting, releasing or controlling or setting a medium flow (pneumatic or hydraulic). The actual function is determined by the relative position of the sealing element 6 to the valve seat or the armature 2 in the armature space.

The sealing element 6 consists of sufficiently elastic material, as it is known for seal nipples and the like, and consists of, for example, polymers, synthetic materials, sponge rubber, silicon and the like. In order to hold the sealing element 6 safely in the right end of the penetration opening 21, on the backside 22 of the armature 2 at the end of the penetration opening 21 an inner flange 27 is provided leading to a certain tapering of the diameter of the penetration opening 21. The armature end surface 24 on the backside 22 includes in its outer area the inner flange 27. The sealing element 6 has a diameter larger than the resulting inner diameter in the area of the inner flange 27. The sealing element 6, however, is sufficiently elastic to press it through the inner flange 27 for mounting purposes.

On the right hand side a sealing surface 61 facing outward is linked to the sealing element 6; this is, if necessary, towards the armature end surface 24 projecting or receding or flush, depending on the design of the valve seat.

On the area of the sealing element 6 opposite the sealing surface 61 in the direction of the rebounding tappet 4 a guide cone 60 is provided immersing in the tappet spring 42. By means of that it is possible that also the tappet spring 42 is supported on the sealing element 6, and thus forms a floating bearing of the two elements, the rebounding tappet 4 and the sealing element 6 in the armature 2. Thus, the tappet spring acts double, it serves for receiving the slowing-down energy when the rebounding tappet 4 bounces during the lifting movement, and presses, on the other hand, the sealing element 6 to the right against the inner flange 27 and the sealing surface 61 on the seal seat.

Although the invention has been described by exact examples which are illustrated in the most extensive detail, it is pointed out that this serves only for illustration, and that the invention is not necessarily limited to it because alternative embodiments and methods become clear for experts in view of the disclosure. Accordingly, changes can be considered which can be made without departing from the contents of the described invention.

The invention claimed is:

1. A solenoid, at least comprising one armature supported in an armature space, wherein the armature space is encircled by a coil carrying a number of windings which can be loaded with electric current, and the magnetic field generated when loaded with electric current moves the armature against a pole core, characterized in that in the armature a rebounding tappet is supported by a supporting bearing to move in an axial direction, such that the rebounding tappet is moveable relative to the armature, and in not electrified condition the distance between a front of the rebounding tappet and the pole core is smaller than the distance between a front of the armature and the pole core, and in the armature an elastic element for the rebounding tappet configured as a rebounding tappet spring is provided, which is compressed when, during loading with electric current, the armature moves towards the pole core and the front of the rebounding tappet is in contact with the pole core, and on the armature a pull-back spring for the armature is arranged, the effective direction of which is in opposite direction of the movement of the armature in the direction of the pole core, and wherein the rebounding tappet spring is designed stronger or weaker than the pull-back spring for the armature.

2. The solenoid according to claim 1, characterized in that the front of the rebounding tappet facing the pole core projects over the armature front.

3. The solenoid according to claim 1, characterized in that in the armature an axial penetration opening for receiving the rebounding tappet is provided.

4. The solenoid according to claim 1, characterized in that a recess in the armature front is provided for receiving the rebounding tappet.

5. The solenoid according to claim 1, characterized in that the rebounding tappet spring is supported on an element of the armature.

6. The solenoid according to claim 1, characterized in that in the rebounding tappet spring is supported on a sealing element, and the sealing element is arranged in the armature on the backside opposite the armature front in a chamber.

7. The solenoid according to claim 1, characterized in that the rebounding tappet has on its base area opposite the front of the rebounding tappet an expansion which is, in non electrified condition, pressed by the rebounding tappet spring against an interior stopper of the armature.

8. The solenoid according to claim 1, characterized in that the pull-back spring for the armature is arranged in the area of the penetration opening facing the pole core.

9. The solenoid according to claim 1, characterized in that in the rebounding tappet spring is supported on a sealing element, and the sealing element is arranged in the armature on the backside opposite the front of the armature in a chamber, and the chamber has on the side opposite the backside a contact shoulder or an inner cone for the sealing element.

10. The solenoid according to claim 1, characterized in that the armature is designed as section of a pipe profile.

11. The solenoid according to claim 1, characterized in that the rebounding tappet consists of metal, steel, light metal, plastic or fiber reinforced plastic.

12. A valve, in particular pneumatic valve, consisting of a solenoid, at least comprising an armature supported in an armature space, wherein the armature is encircled by a coil carrying a number of windings which can be loaded with electric current, and the magnetic field generated by the electrifying moves the armature towards a pole core, wherein in the armature a rebounding tappet is supported by a supporting bearing to move in an axial direction, such that the rebounding tappet is moveable relative to the armature, and in non electrified condition the distance between the rebounding tappet front and the core is smaller than the distance between the armature front and the pole core, and in the armature an elastic element for the rebounding tappet configured as a rebounding tappet spring is provided, which is compressed when, during loading with electric current, the armature moves towards the pole core and the front of the rebounding tappet is in contact with the pole core, and wherein the armature carries on its side opposite the pole core a sealing element which interacts with a seal seat of the valve, and on the armature a pull-back spring for the armature is arranged, the effective direction of which is in opposite direction of the movement of the armature in the direction of the pole core, and wherein the rebounding tappet spring is designed stronger or weaker than the pull-back spring for the armature.

* * * * *